(12) United States Patent
Gao et al.

(10) Patent No.: US 9,030,037 B2
(45) Date of Patent: May 12, 2015

(54) WIND GENERATOR WITH WIND BLADE ROTATING CAGE FOR DRIVING MULTIPLE GENERATORS

(75) Inventors: Changde Gao, Beijing (CN); Yifu Gao, Beijing (CN)

(73) Assignee: Beijing Junantai Protection Technologies Co., Ltd., Beijing (CN)

( * ) Notice: Subject to any disclaimer, the term of this patent is extended or adjusted under 35 U.S.C. 154(b) by 287 days.

(21) Appl. No.: 13/636,655

(22) PCT Filed: Mar. 31, 2011

(86) PCT No.: PCT/CN2011/000560
§ 371 (c)(1),
(2), (4) Date: Nov. 20, 2012

(87) PCT Pub. No.: WO2012/113114
PCT Pub. Date: Aug. 30, 2012

(65) Prior Publication Data
US 2013/0200629 A1 Aug. 8, 2013

(30) Foreign Application Priority Data
Mar. 11, 2011 (CN) .......................... 2011 1 0058694

(51) Int. Cl.
*F03D 7/02* (2006.01)
*H02K 7/18* (2006.01)
*F03D 3/06* (2006.01)
*F03D 9/00* (2006.01)

(52) U.S. Cl.
CPC ................ *H02K 7/183* (2013.01); *F03D 3/062* (2013.01); *F03D 9/002* (2013.01); *F05B 2240/40* (2013.01);

(Continued)

(58) Field of Classification Search
USPC ....................................... 290/44, 55
See application file for complete search history.

(56) References Cited

U.S. PATENT DOCUMENTS 4,048,947 A * 9/1977 Sicard ................................ 440/8
4,220,870 A * 9/1980 Kelly ............................... 290/44

(Continued)

FOREIGN PATENT DOCUMENTS

| JP | 2004301087 A | 10/2004 |
|---|---|---|
| KR | 10-2004-0092295 A | 11/2004 |
| TW | M345879 U | 12/2008 |

OTHER PUBLICATIONS

KR10-2010-0048534A, RES INST IND Science & Tech, May 11, 2010, Whole document.

*Primary Examiner* — Tho D Ta
(74) *Attorney, Agent, or Firm* — Birch, Stewart, Kolasch & Birch, LLP

(57) ABSTRACT

A wind generator with a wind blade rotating cage for driving multiple generators is disclosed. Sixteen wind blades (8) manufactured by a stretch extrusion process are mounted on the periphery of the wind blade rotating cage (5) suspended by magnetic force. Inner gears (3) are mounted on the inner edge of the wind blade rotating cage (5). Two of an upper and a lower generator cabins (12) are provided on an upright post (1) and eight generators with an electromagnetic clutch are provided inside each generator cabin (12). A gear (2) engaged with the inner gear (3) on the wind blade rotating cage (5) is mounted on a generator shaft (26) extending outside the generator cabin (12). The wind blade (8) is outward convex and inward concave, 1.5 meters wide and 40 meters high. The wind blade (8) has a large wind receiving area and is mounted on the periphery, so the torque produced is large. Inner gears (3) drive the gears (2) of the generator to rotate and the loss of kinetic energy is small. A lightning rod is also provided on the wind generator. The wind generator has a high wind energy utilization ratio, a simple structure and a low operation cost.

15 Claims, 2 Drawing Sheets

(52) U.S. Cl.
CPC ....... *F05B 2240/51* (2013.01); *F05B 2260/902* (2013.01); *Y02E 10/74* (2013.01); *F05B 2260/4031* (2013.01)

(56) References Cited

U.S. PATENT DOCUMENTS

| | | | |
|---|---|---|---|
| 4,609,827 A * | 9/1986 | Nepple | 290/44 |
| 4,818,888 A * | 4/1989 | Lenoir, III | 290/43 |
| 4,970,404 A * | 11/1990 | Barger | 290/55 |
| 5,463,257 A * | 10/1995 | Yea | 290/55 |
| 5,664,418 A * | 9/1997 | Walters | 60/398 |
| 7,462,950 B2 | 12/2008 | Hu | |
| 2008/0174119 A1 | 7/2008 | Hu | |
| 2009/0224606 A1* | 9/2009 | Gandy | 307/69 |
| 2011/0006543 A1* | 1/2011 | Hu | 290/55 |
| 2011/0062717 A1* | 3/2011 | Price, Jr. | 290/55 |

* cited by examiner

WIND GENERATOR WITH WIND BLADE ROTATING CAGE FOR DRIVING MULTIPLE GENERATORS

FIELD OF THE INVENTION

The present invention belongs to the field of wind driven generator.

BACKGROUND OF THE INVENTION

Large wind driven generators are almost in the form of horizontal axis: its tri-blade wind turbines with main bearing, slow-speed shaft, speed increaser, high speed shaft, generator, steerage gear, braking system, lubrication system and so on are with high prices and need more maintenance amount. Most of the generators are at the range of 1.5 MW, 3 MW generators are hard to manufacture and hardly to increase the power capability any more.

Now, the wind blades of existing horizontal axis wind turbines are very small and can only drive small generators, the power capability of which is so small that can only use for family and highway lamppost.

SUMMARY OF THE INVENTION

Wind generator with wind blade rotating cage for driving multiple generators of present invention is a kind of wind driven generator with multiple (can be tens of) vertical arranged wind blades and multiple generators. Mechanical transmission only includes large upper inner gear mounted on the wind blade rotating cage and gears of the generator shafts, it does not need any complex equipment such as speed increaser to increase the generator revolution and, it can generate electricity directly; vertical type multiple stage permanent-magnet generator with low speed and medium speed can be adopted to generate electricity high efficiency.

Now that the content of the present invention will be explained below with the constitution of each parts:

The wind blade rotating cage is a rigid truncated cone cage comprising eight or more uniformly distributed truss, upper and lower turntables constituting by outer turntable and inner turntable, the upper and lower turntables are made up of outer post, inner post, inclined pull wire rope and crosswise pull bracket. The inner turntable of the upper and lower turntable is made up of metallic material, the center of which is equipped with large inner gear. If the outer turntable of the upper and lower turntable is manufactured by metallic material or composite materials, the weight will be oversized, then the present invention adopted multiple high-strength ropes (for example 4 wire ropes) to made up the outer turntable, which can reduce the weight of the outer turntable from hundreds of tons to several tons, the high-strength ropes can be fixed to the rope slot of the outer edge of the truss and can be clamped firmly; soleplate is added to both ends of wind blade, by which the wind blade be mounted to multiple high-strength ropes of the upper turntable and lower turntable through mounting plate and bolt.

Identical wind blades can be pultruded by pultrusion machine with fiber glass, basalt fiber and its weaving cloth, mixing with gumming. The wind blade is outward convex and inward concave and is hollowed with reinforced rib, the concave part is attached with various longitudinal windscreen ribs. When the concave part of the wind blade faced wind, large torque can be generated, the convex part is very smooth that the upwind resistance is small, the outward convex and inward concave wind blade will generate energy difference to drive the rotation of the wind blade rotating cage. More than sixteen wind blades are mounted on the outer edge of the wind blade rotating cage, each of the wind blade is tens of meters high, so that the rotation power of the wind blade rotating cage is huge. (if the width of the wind blade is 1.5 m, the length is 40 m, the wind area of the wind blade will be 60 m$^2$). If the wind blade is equipped with wind blade steering device, the resistance will be smaller when it is against the wind and the effect will be better.

The upper turntable and the lower turntable of the wind blade rotating cage are equipped with a pair of rubidium iron boron magnetic suspension respectively, one pole of the magnetic suspension is fixed to the turntable of the wind blade rotating cage, another pole is fixed to the post, the working face of the magnetic suspension is installed at an angle of inclination of 3°-8° with the inner side or outer side of the horizontal direction so as to obtain the upward and inward suspension forces. The magnetic suspension will reduce the friction of the wind blade rotating cage with tens of tons weight to very much small and can make the rotating center of the wind blade rotating cage to be still.

On the upper flat plate of the upper generator cabins and lower generator cabins, there arranged with 8 generator shaft hole and fixing hole of the vertical-type generators, the generator shafts protruded from the upper flat plate is mounted with gears, and each of the generator gear is engaged with the large inner gear fixed on the inner turntable. The height difference of the upper flat plate of two generator cabins is the same as the height difference of the two inner turntables of the wind blade rotating cage.

The transmission of the present invention is simple and high efficient, the wind blade of the cage drives the cage to rotate, the large inner gear fixed to the upper and lower inner turntables drives the generator gears protruded from the upper and lower generator cabins to rotate, then drives the generator rotors to generate electricity. Transmission of energy as follows:

[wind blade]→driving→[wind blade rotating cage to rotate]→driving→[inner gear to rotate]→engage→[generator gear]→drive→[generator generate electricity]

The power transmission path is so simple that it could not to reduce any more, and the kinetic energy loss is small, the wind energy application rate is high and the power can be huge.

Both of the upper and lower generator cabins can equip with 8 generators, the generator can adopt technology maturated and operation reliable permanent magnetism multi stage generator. Permanent magnetism multi stage generator has multiple poles, and has no carbon brush to generate sparkle, it can high efficiency generate electricity with revolution at 15-350 rpm, the starting torque thereof is small and is the very generator suitable for wind power generation. The electromagnetic clutch can be equipped to the input end of the generator, at the beginning of the start, only tow generators can be connected, then after starting, more generators can be add in gradually to reach the full capacity, so that the present invention is a kind wind driven generator suit for small wind.

The inner turntable of the wind blade rotating cage is equipped with vertical brake rings, four or six wheels with telescopic hydraulic cylinders are mounted on the post, when hydraulic cylinders extend out, the wheels will press against the brake rings, the brake rings of the braking system brake the wind blade rotating cage to slow down gradually.

The advantages of the present invention include:

The wind blades are installed on the outer edge of the wind blade rotating cage, the wind blade could be with more than 2 m width and tens of meters high, and has large wind collecting area to deliver larger torque. With multiple technology maturated generators, the transmission could be only include a inner gear and generator gears, the structure is very much simple and operation reliable, need no more maintenance amount. The top of the posts is equipped with a lightning rod can not be struck by lightning wind blades. The rubidium iron boron magnetic suspension hardly generates any friction and could position accurately. The transmission has only one stage so that the energy lost will be little. The whole area of the concave part of the windward side can all generate energy, the wind collection area is large, the point of the wind collection area is far from the center of the rotation, which could generate large torque with small friction, and the energy lost is so little as to be able to manufacture wind turbines with more than 10 MW.

DESCRIPTION OF THE DRAWING

In FIG. 1, (1) is the post with two generator cabins, 2 is the generator gear, 3 is the inner gear of the wind blade turntable, 4 is generator, 5 is wind blade rotating cage, 6 is the magnetic suspensions pair, 7 is the support of the magnetic suspensions, 8 is wind blade, 9 is the outer turntable made up of high strength ropes, 10 is lower magnetic suspension, 11 is the dust shield of the gears, 12 is the lower generator cabin.

In FIG. 2, 21 is wind blade, 22 is the outer cabin made up of 4 high strength ropes, 23 is the truss of the cabin, 24 is the inner gears mounted on the inner cabin, 25 is the gear of the shaft of the generator, 26 is the shaft of the generator, 27 is the post.

DESCRIPTION OF PREFERRED EMBODIMENT

Example 1

Figure 1:
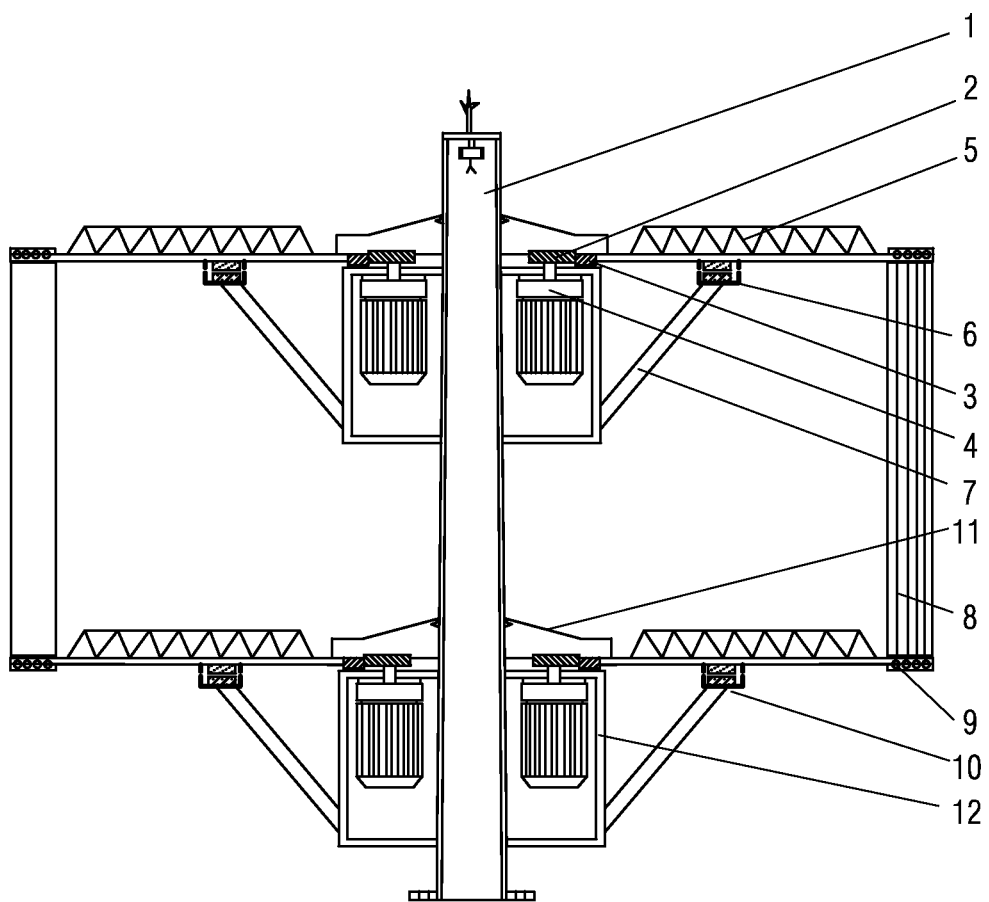
FIG. 1 is schematic view of the intermediate cross section of the wind generator with wind blade rotating cage for driving multiple generators.
Figure 2:
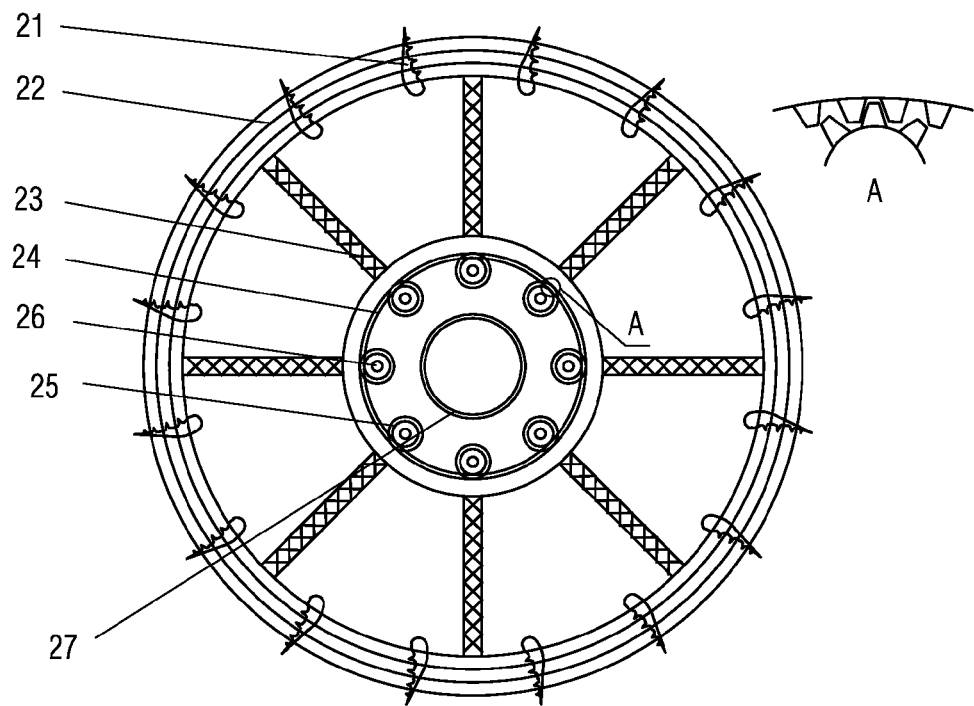
FIG. 2 is the schematic top view of the wind blades, outer gears, and gears.
Figure 3:
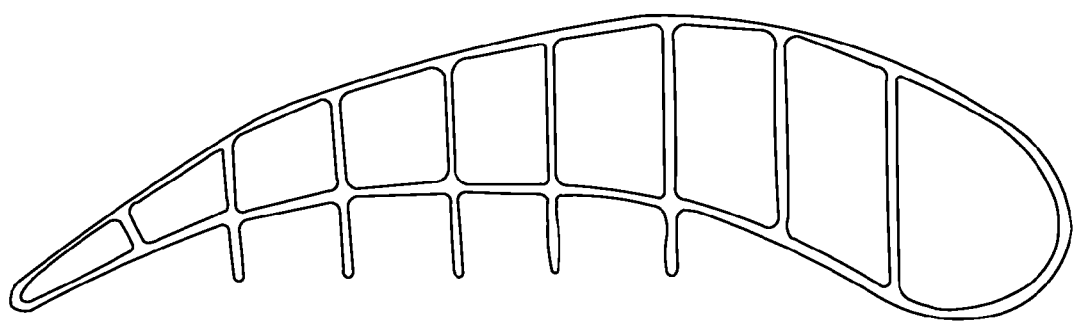
FIG. 3 is the schematic view of the cross section of the wind blade. There are several wind blades behinds the intermediate cross section in FIG. 1 are not shown in order to make the structure more clear.

The diameter of the wind blade rotating cage is 80 m, the height of which is 40 m, the width of the wind blade is 1.5 m, the length of which is 40 m, the high strength ropes are used by 4 steel ropes with specification of ¢30 and 7×39, the inner cabin is made of steel plate with thickness of 30 mm, the diameter of which is 7 m, adopted with respective 8 triangular trusses (with length of 35 m) for both of the upper and lower side, the connecting pieces of the trusses connect with the steel ropes of the inner cabin and outer cabin, the upper and lower cabin trusses are mounted with outer post, inner post, inclined pull wire rope, crosswise post supporting tube respectively, which make the cabin be a rigid cylinder. Sixteen wind blades made by a stretch extrusion process are installed on 4 steel ropes of the outer edge of the outer cabin. The inner cabin has inner gear with fixed modulus of 8, number of teeth of 650, there are downward magnetic suspensions slots on the inner cabin near the location of the diameter of 7 m, corresponding to upper side of the installation location of the magnetic suspensions, there are strengthen ribs to keep the track of the magnetic suspensions to remain horizontal, one ton of neodymium-iron-boron magnetic suspensions can hung up 100 tons weight, then the upper and lower magnetic suspensions use 2 tons of neodymium-iron-boron magnets, which installed at an angle of inclination of 7° with the inner side of the horizontal direction.

Each of the upper and lower generator cabins is arranged with 8 permanent magnetism multistage generators, the electromagnetic clutch is installed on the input end of the generator, gears made up lubrication-free nylon are mounted on the bold shaft extended from the top flat surface of the generator cabin with modulus of 8, number of teeth of 28, width of 150 mm, these gears are all engaged with the inner gear. The generator cabin has a diameter of 6 m, the diameter of the post is 3 m, the post and generator cabin are segment manufactured and field installed.

With such wind area, when the speed of the wind reaches 5 m/s-10 m/s, 12 MW electricity will be generated.

Example 2

The wind blade rotating cage is 80 m in diameter, the width of the wind blade is 2 m, the height of the wind blade is 60 m, there are 24 wind blades installed and result in more electricity generation capacity.

Example 3

The wind blade rotating cage is 10 m in diameter, the width of the wind blade is 0.35 m, the height of the wind blade is 8 m, there are 4 permanent magnetism multistage generators of 3 KW are installed in the generator cabins, which can obtain more than 10 KWm electricity supplying to microwave stations and families.

What is claimed is:

1. A wind generator, the said wind generator has a wind blade rotating cage for driving multiple generators, the said wind blade rotating cage is a rigid circular cylinder comprising upper and lower turntables, vertical post, crosswise post, inclined pull wire rope, the inner side of the said upper and lower turntables is equipped with inner turntable, outer side of which is equipped with outer turntable, the said inner and outer turntable is constituted by trusses; the said wind generator comprises a post with two generator cabins; multiple wind blades are installed on the outer edge of the said wind blade rotating cage, the inner side of the said wind blade rotating cage is attached with a pair of upper and lower large inner gear, the said wind blade rotating cage is suspension supported by multiple magnetic suspensions, the said multiple generators are installed in the said generator cabins, gearings are installed at the shafts of the generators extended from the top of cabins, which mesh with the inner gears on the wind blade rotating cage.

2. The wind generator according to claim 1, characterized in that each of the said generator cabins on the said post can mount with multiple vertical permanent-magnet generator with clutches.

3. The wind generator according to claim 1, characterized in that the outer turntable of the said upper and lower turntable of the wind blade rotating cage is made up of multiple high-strength ropes to reduce the weight of the wind blade rotating cage.

4. The wind generator according to claim 1, characterized in that the said wind blade is made up of pultruded composite materials, which is outward convex and inward concave and is hollowed with reinforced rib, the concave part is attached with various longitudinal windscreen ribs.

5. The wind generator according to claim 1, characterized in that the said wind blade rotating cage is hung up by neodymium-iron-boron magnets with no electricity, which installed at an angle of inclination of 3°-8° with the inner side or outer side of the horizontal direction so as to obtain the upward and inward suspension forces.

6. The wind generator according to claim 1, characterized in that a braking system is also installed on the outside of the said post, the said braking system include four or six wheels with telescopic hydraulic cylinders, when the braking device extends out, the wheels will press against the brake rings fixed on inter rotary plates.

7. The wind generator according to claim 1, characterized in that the said post with generator cabin is segment manufactured and field installed, the lightning rod is mounted on the top of the post, a lifting cage is housing in the post, the accessory electrical equipment and control system can be mounted in the room on the ground.

8. A wind generator comprising:
a wind blade rotating cage configured to drive multiple generators, the wind blade rotating cage including:
upper and lower turntables, each turntable having an inner turntable and an outer turntable joined by a plurality of trusses, each inner turntable forming an inner gear; and
a plurality of wind blades located between the outer turntables of the upper and lower turntable;
a post;
upper and lower generator cabins arranged along a center axis of the post, each of the upper and lower cabins including at least one generator of the multiple generators, each generator having a shaft and a gear mounted on the shaft to mesh with a corresponding one of the inner gears of the upper and lower turntables; and
an upper and lower magnetic suspension extending between the upper and lower generator cabins and the upper and lower turntables, respectively.

9. The wind generator according to claim 8, wherein each of the upper and lower cabins have at least two generators of the multiple generators, each of the generators is a vertical permanent-magnet generator with clutches.

10. The wind generator according to claim 8, wherein the wind blade rotating cage is a rigid circular cylinder and each of the upper and lower turntables includes an outer post, an inner post, an inclined pull wire rope and a crosswise bracket.

11. The wind generator according to claim 8, wherein the outer turntable of each of the upper and lower turntables is made up of multiple high-strength ropes.

12. The wind generator according to claim 8, wherein each wind blade is made up of pultruded composite materials, has an outward convex surface and an inward concave surface, is hollowed with at least one reinforced rib, and concave part includes a plurality of longitudinal windscreen ribs.

13. The wind generator according to claim 8, wherein the wind blade rotating cage is suspended by neodymium-iron-boron magnets with no electricity, which are installed at an angle of inclination of 3°-8° with respect to a horizontal plane so as to obtain upward and inward suspension forces.

14. The wind generator according to claim 8, further comprising a braking system located on an outside of the post, the braking system including four or six wheels with telescopic hydraulic cylinders, and, when the braking device extends out, the wheels are configured to press against brake rings fixed on inter rotary plates.

15. The wind generator according to claim 8, further comprising a lightning rod mounted on the top of the post.

* * * * *